US011412161B2

(12) United States Patent
Nishimura et al.

(10) Patent No.: US 11,412,161 B2
(45) Date of Patent: Aug. 9, 2022

(54) IMAGE PROCESSING METHOD, IMAGE PROCESSING DEVICE, AND INFORMATION SYSTEM

(71) Applicant: Seiko Epson Corporation, Tokyo (JP)

(72) Inventors: Teruyuki Nishimura, Matsumoto (JP); Ryoki Watanabe, Matsumoto (JP); Hikaru Kurasawa, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/941,704

(22) Filed: Jul. 29, 2020

(65) Prior Publication Data

US 2021/0037198 A1 Feb. 4, 2021

(30) Foreign Application Priority Data

Jul. 30, 2019 (JP) .............................. JP2019-139658

(51) Int. Cl.
- *H04N 5/33* (2006.01)
- *G01J 3/28* (2006.01)
- *G01J 3/36* (2006.01)

(52) U.S. Cl.
CPC ............ *H04N 5/332* (2013.01); *G01J 3/2823* (2013.01); *G01J 3/36* (2013.01); *G01J 2003/2826* (2013.01)

(58) Field of Classification Search
USPC ........................................................ 348/164
See application file for complete search history.

(56) References Cited

U.S. PATENT DOCUMENTS

| | | | | |
|---|---|---|---|---|
| 2003/0179212 A1* | 9/2003 | Matsushiro | .......... | H04N 1/6033 345/597 |
| 2007/0064127 A1* | 3/2007 | Millar | .................... | G09G 5/026 348/239 |
| 2007/0064272 A1* | 3/2007 | Mizutani | ............ | H04N 1/40087 358/3.14 |
| 2008/0043270 A1* | 2/2008 | Kim | ..................... | H04N 1/6027 358/1.9 |
| 2008/0267472 A1* | 10/2008 | Demos | ............... | A61B 1/00009 382/128 |
| 2010/0067002 A1* | 3/2010 | Ishii | ..................... | A61B 1/0638 356/317 |
| 2011/0230719 A1* | 9/2011 | Katakura | ............... | A61B 1/043 600/156 |
| 2019/0364252 A1* | 11/2019 | Kubo | ................... | H04N 9/3179 |

FOREIGN PATENT DOCUMENTS

| | | |
|---|---|---|
| CN | 206865574 U | 1/2018 |
| JP | 2013-258455 A | 12/2013 |

* cited by examiner

*Primary Examiner* — Behrooz M Senfi
(74) *Attorney, Agent, or Firm* — Harness, Dickey & Pierce, P.L.C.

(57) ABSTRACT

An image processing method includes: an image pickup step of picking up an RGB image of a target object to be picked up, and picking up a spectroscopic image of the target object in a predetermined wavelength range and thus acquiring spectroscopic information peculiar to the target object in the wavelength range; and a display step of displaying a complemented image complemented by superimposing the spectroscopic information on the RGB image.

7 Claims, 9 Drawing Sheets

IMAGE PROCESSING METHOD, IMAGE PROCESSING DEVICE, AND INFORMATION SYSTEM

The present application is based on, and claims priority from JP Application Serial Number 2019-139658, filed Jul. 30, 2019, the disclosure of which is hereby incorporated by reference herein in its entirety.

BACKGROUND

1. Technical Field

The present disclosure relates to an image processing method, an image processing device, and an information system.

2. Related Art

An application or the like installed in an information terminal such as a smartphone displays an RGB image picked up by an RGB camera provided in the information terminal, on a display provided in the information terminal, or prints the RGB image as a printed object, that is, as a photograph, using a printer.

Recently, an image processing method in which two RGB images picked up in different wavelength ranges are superimposed together to display a high-definition RGB image has been proposed. JP-A-2013-258455 is an example of this image processing method.

However, in the image processing method in which two RGB images are superimposed together to provide an image to be displayed, as described above, both of the images used for superimposition are RGB images. Therefore, the method has a problem in that it is difficult to display a high-definition image in a wavelength range where some RGB images cannot be easily acquired.

SUMMARY

The present disclosure can be implemented as the following application example.

An image processing method according to an application example of the present disclosure includes: an image pickup step of picking up an RGB image of a target object to be picked up, and picking up a spectroscopic image of the target object in a predetermined wavelength range and thus acquiring spectroscopic information peculiar to the target object in the wavelength range; and a display step of displaying a complemented image complemented by superimposing the spectroscopic information on the RGB image.

DESCRIPTION OF EXEMPLARY EMBODIMENTS

The image processing method, the image processing device, and the information system according to the present disclosure will now be described in detail, based on preferred embodiments shown in the accompanying drawings.

In the description below, the information system according to the present disclosure is described before the description of the image processing method and the image processing device according to the present disclosure.

Information System

First Embodiment

Figure 1:
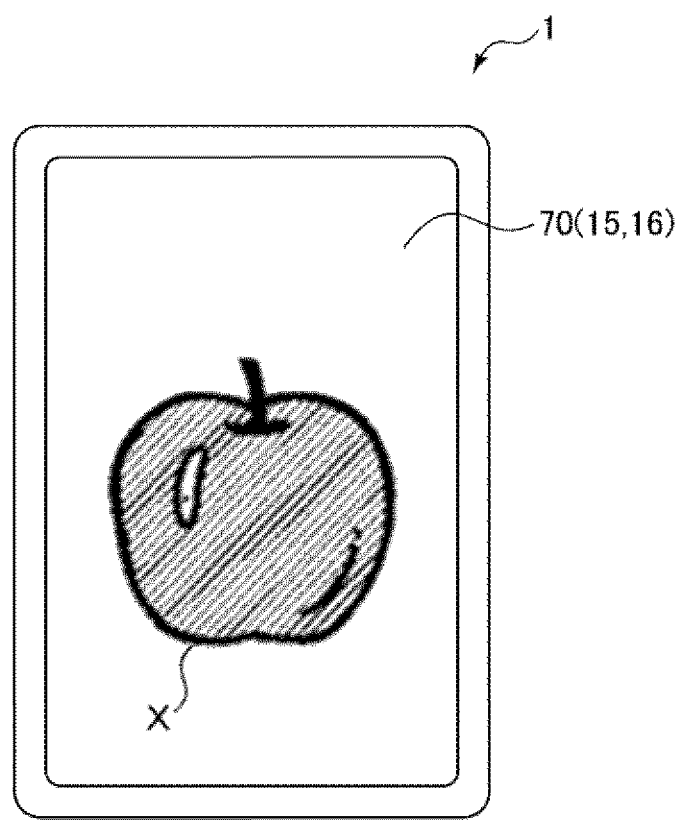
FIG. 1 is a plan view showing the face side of an overall picture of a smartphone, which is an information terminal to which a first embodiment of the information system according to the present disclosure is applied.
Figure 2:
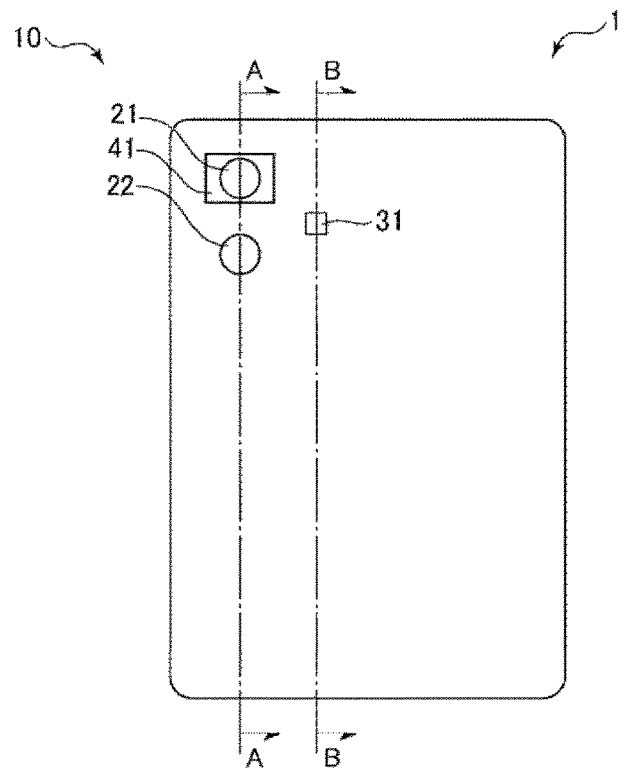
FIG. 2 is a plan view showing the back side of the overall picture of the smartphone, which is the information terminal to which the first embodiment of the information system according to the present disclosure is applied.
Figure 3:
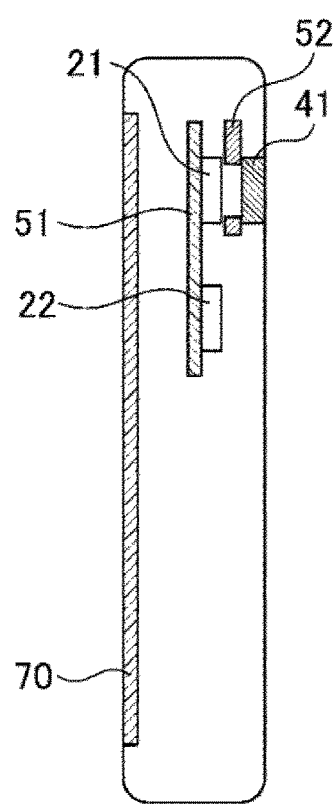
FIG. 3 is a cross-sectional view of the smartphone shown in FIG. 2, taken along A-A.
Figure 4:
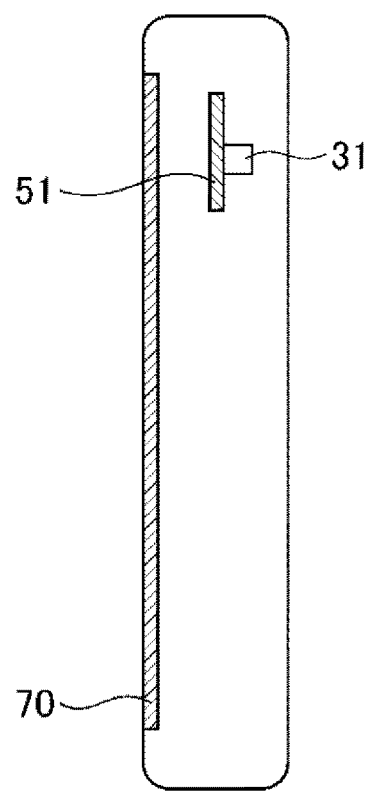
FIG. 4 is a cross-sectional view of the smartphone shown in FIG. 2, taken along B-B.
Figure 5:
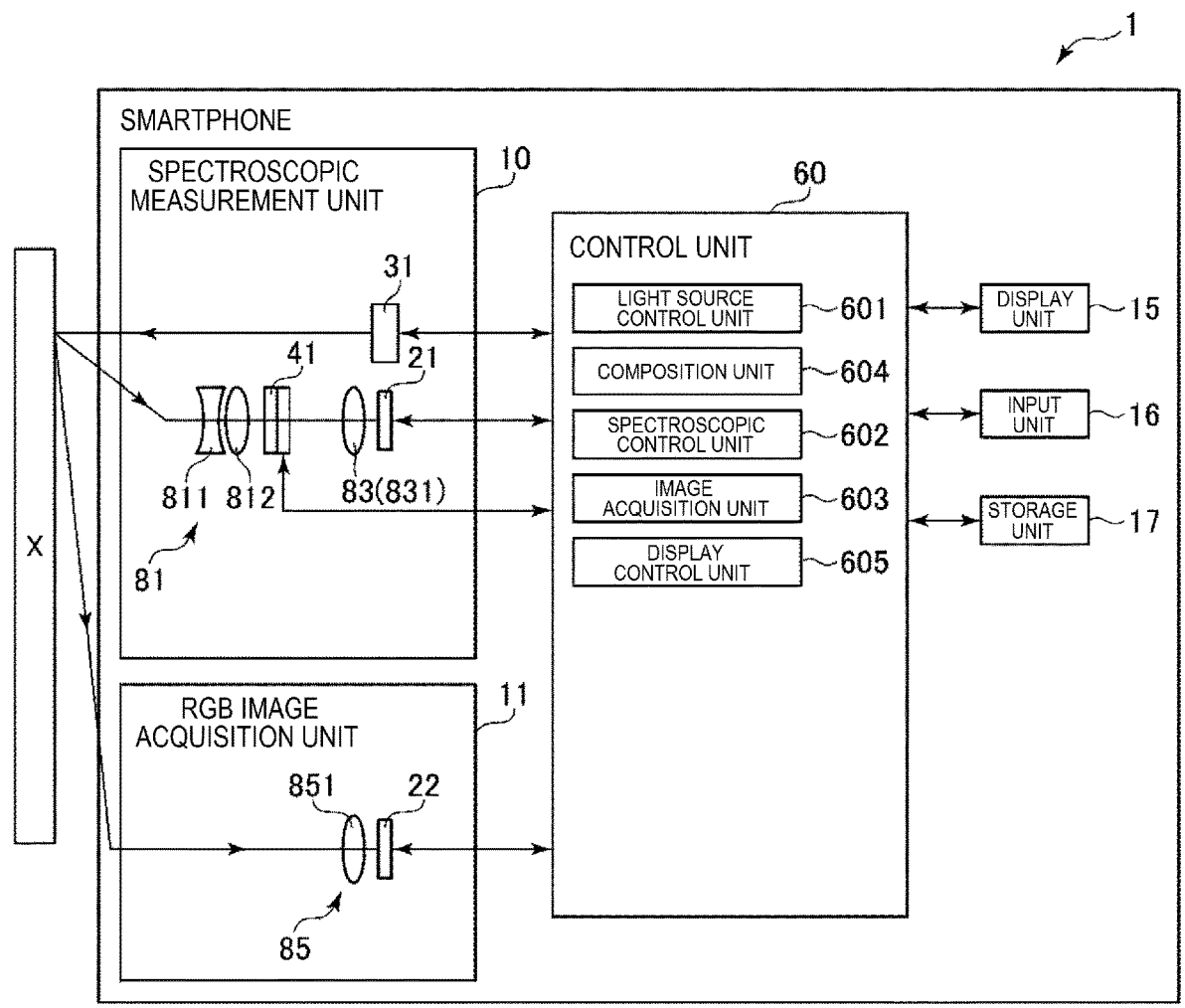
FIG. 5 is a block diagram showing a schematic configuration of the smartphone shown in FIGS. 1 and 2.
Figure 6:
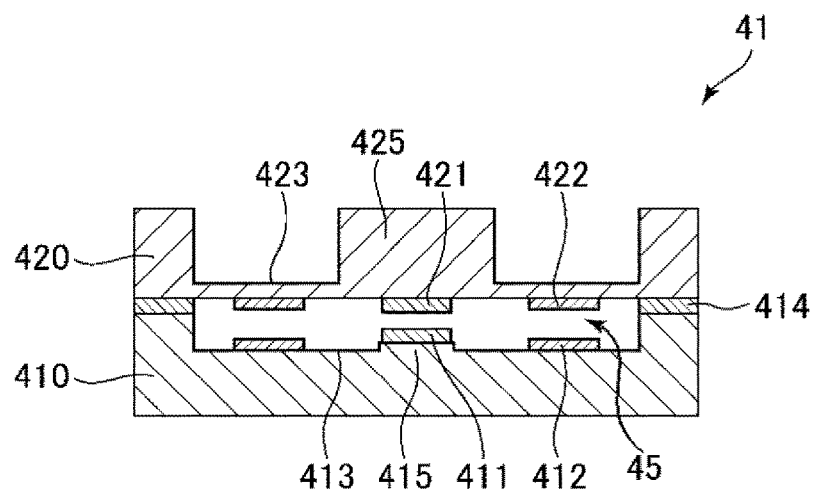
FIG. 6 is a vertical cross-sectional view showing an example in which a wavelength-tunable interference filter in a spectroscopic unit provided in a spectroscopic measurement unit of the smartphone shown in FIGS. 1 and 2 is applied to a Fabry-Perot etalon filter.
Figure 7:
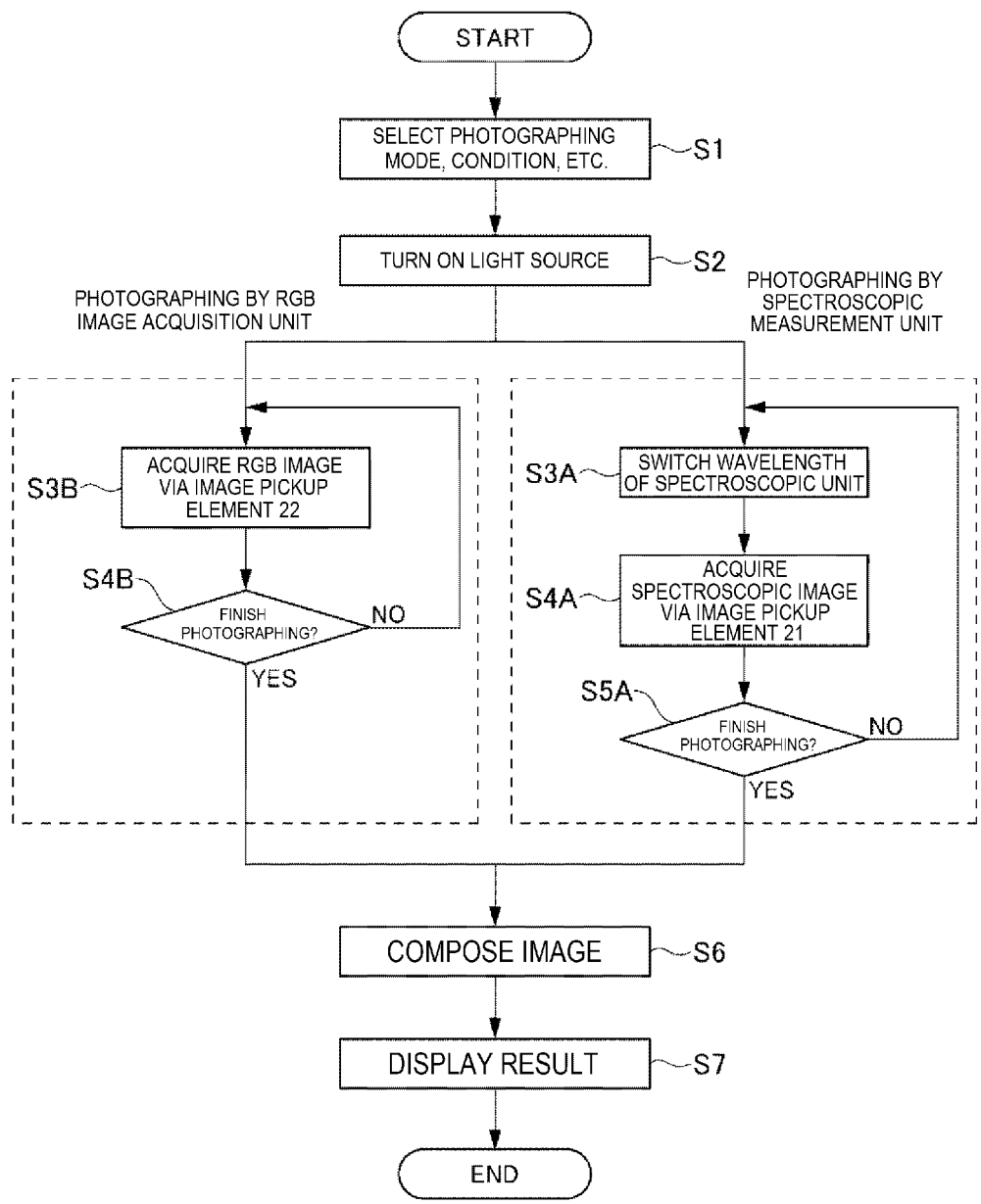
FIG. 7 is a flowchart showing an image processing method for acquiring an image of an image pickup target object by the smartphone shown in FIGS. 1 and 2.
Figure 8:
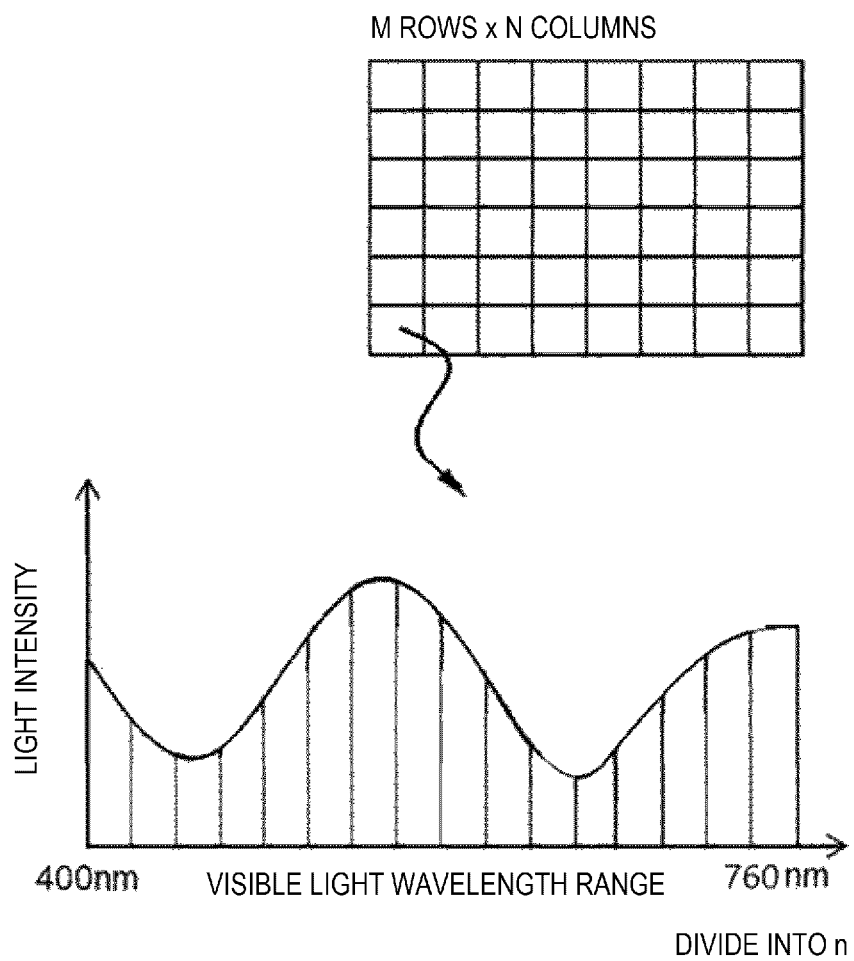
FIG. 8 is a schematic view for explaining spectroscopic information peculiar to an image pickup target object, acquired by picking up an image of the image pickup target object by the spectroscopic measurement unit provided in the smartphone shown in FIGS. 1 and 2.

FIG. 1 is a plan view showing the face side of an overall picture of a smartphone, which is an information terminal to which a first embodiment of the information system according to the present disclosure is applied. FIG. 2 is a plan view showing the back side of the overall picture of the smartphone, which is the information terminal to which the first embodiment of the information system according to the present disclosure is applied. FIG. 3 is a cross-sectional view of the smartphone shown in FIG. 2, taken along A-A. FIG. 4 is a cross-sectional view of the smartphone shown in FIG. 2, taken along B-B. FIG. 5 is a block diagram showing a schematic configuration of the smartphone shown in FIGS. 1 and 2. FIG. 6 is a vertical cross-sectional view showing an example in which a wavelength-tunable interference filter in a spectroscopic unit provided in a spectroscopic measurement unit of the smartphone shown in FIGS. 1 and 2 is applied to a Fabry-Perot etalon filter. FIG. 7 is a flowchart showing an image processing method for acquiring an image of an image pickup target object by the smartphone shown in FIGS. 1 and 2. FIG. 8 is a schematic view for explaining spectroscopic information peculiar to an image pickup target object, acquired by picking up an image of the image pickup target object by the spectroscopic measurement unit provided in the smartphone shown in FIGS. 1 and 2.

Hereinafter, in this embodiment, the case where the information system according to the present disclosure is applied to a smartphone 1 (SP), which is a type of information terminal, that is, the case where the information system according to the present disclosure and the image processing device according to the present disclosure are completed single-handedly by the smartphone 1 as an information terminal, is described.

The smartphone 1 is a portable information terminal having an image pickup function to pick up an image of an image pickup target object X, that is, a target object to be picked up. The smartphone 1 has: an RGB camera picking up an RGB image of the image pickup target object X; a spectroscopic camera picking up a spectroscopic image of the image pickup target object X in a predetermined wavelength range and thus acquiring spectroscopic information peculiar to the image pickup target object X in the wavelength range; a storage unit 17 storing the RGB image and the spectroscopic information; and a display unit 15 that can display the RGB image and the spectroscopic information. According to the present disclosure, the display unit 15 is configured to display a complemented image complemented by superimposing the spectroscopic information on the RGB image.

In the smartphone 1 according to this embodiment, the spectroscopic camera is formed of a spectroscopic measurement unit 10 picking up a spectroscopic image of the image pickup target object X and thus acquiring spectroscopic information peculiar to the image pickup target object X, and the RGB camera is formed of an RGB image acquisition unit 11 picking up an RGB image of the image pickup target object X.

In the smartphone 1 of such a configuration, spectroscopic information over a predetermined wavelength range acquired by the spectroscopic camera, that is, spectroscopic measurement unit 10, is superimposed on an RGB image acquired by the RGB camera, that is, the RGB image acquisition unit 11. Thus, a complemented image, that is, the RGB image complemented with the spectroscopic information, is acquired. Therefore, the display unit 15 can display this complemented image as a higher-definition image.

The predetermined wavelength range acquired by the spectroscopic camera, that is, the spectroscopic measurement unit 10, is not limited to a range selected from the visible light range and may be selected from the infrared range, the ultraviolet range or the like.

The configuration of each part of the smartphone 1 having such an RGB camera and spectroscopic camera, that is, the RGB image acquisition unit 11 and the spectroscopic measurement unit 10, will now be described.

Display Unit 15 and Input Unit 16

In the smartphone 1, a display 70 functions both as the display unit 15 and as an input unit 16. The display unit 15 is formed of, for example, any one of various image display devices such as a liquid crystal display or organic EL display. As shown in FIG. 1, the display unit 15 is provided on the face side of the smartphone 1 and displays a visualized image including a picked-up image of the image pickup target object X as an essential image and also including other information. Also, according to the present disclosure, the display unit 15 and the input unit 16 may be provided separately.

The visualized image displayed on the display unit 15 includes the picked-up image of the image pickup target object X, that is, a complemented image, and also includes, for example, information such as the date of image pickup of the image pickup target object X and the type of the image pickup target object X. In FIG. 1, a complemented image when an image of an apple as the image pickup target object X is picked up is displayed.

The input unit 16 is provided, for example, at the surface of the display unit 15 and is formed of a touch panel having a touch-sensitive surface and a sensor for detecting the strength of a touch on the touch-sensitive surface. The input unit 16 accepts an operation instruction by a user (operator), that is, an input of a mode, that is, a condition or the like, for image pickup of the image pickup target object X.

Storage Unit 17

The storage unit 17 is formed of any one of various storage devices (memories) such as a ROM or RAM. The storage unit 17 stores various data necessary for controlling the smartphone 1, particularly for controlling the spectroscopic measurement unit 10 and the RGB image acquisition unit 11, and the spectroscopic image and the RGB image acquired by the spectroscopic measurement unit 10 and the RGB image acquisition unit 11, respectively.

This data includes, for example, an application, program or the like to implement each function provided in a control unit 60, and correlation data V-A data representing the wavelength of transmitted light to a drive voltage applied to an electrostatic actuator 45 provided in a Fabry-Perot etalon filter of a spectroscopic unit 41 provided in the spectroscopic measurement unit 10, and the like.

Spectroscopic Measurement Unit 10

The spectroscopic measurement unit 10 functions as a so-called spectroscopic camera which receives and spectrally disperses reflected light reflected off the image pickup target object X, thus acquires light of a selected specific wavelength or in a specific wavelength range (hereinafter the "specific wavelength" is used as a general term), then picks up, or captures, an image having this specific wavelength, and thus acquires a spectroscopic image.

In this embodiment, the spectroscopic measurement unit 10 has a light source 31 casting light onto the image pickup target object X, that is, image pickup target object, an image pickup element 21 picking up a spectroscopic image based on reflected light reflected off the image pickup target object X, and a spectroscopic unit 41 selectively emitting light of a predetermined wavelength from incident light and being able to change the specific wavelength of exiting light to be emitted.

In such a spectroscopic measurement unit 10, the spectroscopic unit 41 is arranged between the image pickup element 21 and the image pickup target object X in the state where the light source 31 and the image pickup element 21 are arranged facing the same direction at the back side of the smartphone 1, as shown in FIG. 2. Arranging the light source 31, the spectroscopic unit 41, and the image pickup element 21 in such a positional relationship enables these components to form the spectroscopic measurement unit 10 as a post-dispersive spectroscopic camera. Such a post-dispersive spectroscopic camera scans wavelengths over a certain measurement range (predetermined range) to acquire a specific wavelength and a spectral shape and thus can grasp characteristics of the image pickup target object X. Therefore, the post-dispersive method is effective in the case of measuring, that is, picking up an image of, the image pickup target object X with an unknown specific wavelength.

The spectroscopic measurement unit 10 may also form a pre-dispersive spectroscopic camera where the spectroscopic unit 41 is arranged between the light source 31 and the image pickup target object X. The pre-dispersive spectroscopic camera with such a configuration casts light of a specific wavelength and thus can grasp characteristics of the image pickup target object X. Therefore, the pre-dispersive method is effective in the case of measuring the image pickup target object X whose specific wavelength is known. The pre-dispersive method results in a smaller amount of information than the post-dispersive method and is therefore advantageous in that the measuring time is shorter.

The configuration of each part of the spectroscopic camera, that is, the spectroscopic measurement unit 10, will now be described.

Light Source 31

The light source 31 is an optical element casting illuminating light toward the image pickup target object X.

The light source 31 is arranged on a circuit board 51 arranged inside the casing of the smartphone 1 and is arranged at the back side of the smartphone 1 so as to be able to cast illuminating light toward the image pickup target object X, as shown in FIGS. 2 and 4.

The spectroscopic unit is not arranged between the light source 31 and the image pickup target object X. Therefore, the light emitted from the light source 31 is directly cast onto the image pickup target object X.

Such a light source 31 is, for example, an LED light source, OLED light source, xenon lamp, halogen lamp or the like. A light source having a light intensity over an entire wavelength range where the spectroscopic unit 41 formed of a wavelength-tunable interference filter performs spectroscopic measurement, that is, a light source that can cast white light having a light intensity over the entire visible light range, is preferably used. Also, the light source 31 preferably has, for example, a light source that can cast light of a predetermined wavelength such as infrared light, other than a white light source. This can expand the range of specific wavelengths from which to select the specific wavelength of the spectroscopic image acquired by the image pickup element 21.

The illuminating light from the light source 31 is used not only for the acquisition of the spectroscopic image by the spectroscopic measurement unit 10 but also for the acquisition of the RGB image by the RGB image acquisition unit 11. The light source 31 is not limited to being provided in the spectroscopic measurement unit 10 as in this embodiment but may also be provided in the RGB image acquisition unit 11.

Image Pickup Element 21

The image pickup element 21 functions as a detection unit which picks up, or captures, an image based on reflected light reflected off the image pickup target object X and thus detects the reflected light reflected off the image pickup target object X.

The image pickup element 21 is arranged on the circuit board 51 arranged inside the casing of the smartphone 1 and is arranged at the back side of the smartphone 1 so as to be able to receive the reflected light reflected off the image pickup target object X, as shown in FIGS. 2 and 3.

The spectroscopic unit 41 is arranged between the image pickup element 21 and the image pickup target object X. Thus, exiting light having the specific wavelength, of incident light incident on the spectroscopic unit 41 from the image pickup target object X, is selectively emitted. This exiting light is picked up as a spectroscopic image by the image pickup element 21.

Such an image pickup element 21 is formed of, for example, a CCD, CMOS or the like, and is formed of a monochrome image pickup element so that the intensity of the exiting light having the specific wavelength emitted from the spectroscopic unit 41 is detected.

Spectroscopic Unit 41

The spectroscopic unit 41 selectively emits light of a spectral wavelength that is the specific wavelength from incident light and can change the wavelength range of exiting light to be emitted. That is, the spectroscopic unit 41 emits the light of the specific wavelength from the incident light as exiting light toward the image pickup element 21.

The spectroscopic unit 41 is arranged on a circuit board 52 arranged inside the casing of the smartphone 1, as shown in FIG. 3.

The spectroscopic unit 41 is arranged between the image pickup element 21 and the image pickup target object X, that is, on the optical axis between these. Thus, exiting light having the specific wavelength, of the incident light incident on the spectroscopic unit 41 from the image pickup target object X, is selectively emitted toward the image pickup element 21.

Such a spectroscopic unit 41 is formed of a wavelength-tunable interference filter so as to be able to change the wavelength range of the exiting light to be emitted. Although not particularly limited, preferably, this wavelength-tunable interference filter is, for example, a wavelength-tunable Fabry-Perot etalon filter which adjusts the size of a gap between two filters (mirrors) by an electrostatic actuator and thus controls the wavelength of reflected light transmitted there, acousto-optic tunable filter (AOTF), linear variable filter (LVF), liquid crystal tunable filter (LCTF) or the like. Particularly, the Fabry-Perot etalon filter is preferable.

The Fabry-Perot etalon filter is configured to extract reflected light of a desired wavelength, utilizing multiple interference by the two filters. Therefore, its thickness can be set to be very small, specifically 2.0 mm or less. This enables miniaturization of the spectroscopic unit and hence the smartphone 1 having the spectroscopic measurement unit 10. Thus, using the Fabry-Perot etalon filter as the wavelength-tunable filter can achieve further miniaturization of the spectroscopic measurement unit 10.

The spectroscopic unit 41 employing the wavelength-tunable Fabry-Perot etalon filter as the wavelength-tunable interference filter will now be described with reference to FIG. 6.

The Fabry-Perot etalon filter is a rectangular plate-like optical member, as viewed in a plan view, and has a fixed substrate 410, a moving substrate 420, a fixed reflection film 411, a moving reflection film 421, a fixed electrode 412, a moving electrode 422, and a bonding film 414. The fixed substrate 410 and the moving substrate 420 in a stacked state are bonded together as one body via the bonding film 414.

On the fixed substrate 410, a groove 413 is formed by etching in the direction of thickness, surrounding its center part, so that a reflection film placing part 415 is formed at the center part. The fixed substrate 410 of such a configuration is provided with a fixed optical mirror formed of the fixed reflection film 411 on the moving substrate 420 side of the reflection film placing part 415 and is provided with the fixed electrode 412 on the moving substrate 420 side of the groove 413.

On the moving substrate 420, a holding part which is a groove 423 is formed by etching in the direction of thickness, surrounding its center part, so that a moving part which is a reflection film placing part 425 is formed at the center part. The moving substrate 420 of such a configuration is provided with a moving optical mirror formed of the moving reflection film 421 on the fixed substrate 410 side of the reflection film placing part 425, that is, on the lower surface side, and is provided with the moving electrode 422 on the fixed substrate 410 side.

The moving substrate 420 is formed in such a way that the groove 423 has a smaller thickness dimension than the reflection film placing part 425. Thus, the groove 423 functions as a diaphragm flexing due to an electrostatic attraction generated when a voltage is applied between the fixed electrode 412 and the moving electrode 422.

The fixed substrate 410 and the moving substrate 420 can be prepared to a thickness of approximately 0.1 mm or more and 1.0 mm or less. Therefore, the thickness of the entirety of the Fabry-Perot etalon filter can be set to 2.0 mm or less. Thus, miniaturization of the spectroscopic measurement unit 10 can be achieved.

Between the fixed substrate 410 and the moving substrate 420, the fixed reflection film 411 and the moving reflection film 421 are arranged facing each other via a gap substantially at a center part of the fixed substrate 410 and the moving substrate 420. The fixed electrode 412 and the moving electrode 422 are arranged facing each other via a gap at a groove surrounding the center part. Of these components, the fixed electrode 412 and the moving electrode 422 together form an electrostatic actuator 45 adjusting the size of the gap between the fixed reflection film 411 and the moving reflection film 421.

The holding part, which is the groove 423, flexes due to an electrostatic attraction generated by applying a voltage between the fixed electrode 412 ad the moving electrode 422 forming the electrostatic actuator 45. This can change the size of the gap, that is, the distance, between the fixed reflection film 411 and the moving reflection film 421. Setting this gap to a proper size enables selection of a wavelength of light that is to be transmitted and selective emission of light having a desired wavelength (wavelength range) from incident light. Also, changing the configuration of the fixed reflection film 411 and the moving reflection film 421 enables control of the half width of light that is to be transmitted, that is, the resolution of the Fabry-Perot etalon filter.

The fixed substrate 410 and the moving substrate 420 are respectively formed of, for example, any one of various types of glass such as soda-lime glass, crystalline glass, quartz glass, lead glass, potassium glass, borosilicate glass, and non-alkaline glass, or quartz crystal or the like. The bonding film 414 is formed of, for example, a plasma polymer film containing siloxane as a principal material, or the like. The fixed reflection film 411 and the moving reflection film 421 are formed of, for example, a metal film of Ag or the like, an alloy film of an Ag alloy or the like, or a dielectric multilayer film having $TiO_2$ as a high-refractive layer and $SiO_2$ as a low-refractive layer. The fixed electrode 412 and the moving electrode 422 are formed of any one of various electrically conductive materials.

Optical Systems 81, 83

In this embodiment, the spectroscopic measurement unit 10 has optical systems 81, 83 formed of various optical components, as shown in FIG. 5.

The spectroscopic unit-side optical system 81 is arranged between the image pickup target object X and the spectroscopic unit 41. The spectroscopic unit-side optical system 81 has an incident lens 811 as an incident optical system and a projection lens 812, and guides reflected light reflected off the image pickup target object X to the spectroscopic unit 41.

The image pickup element-side optical system 83 is arranged between the spectroscopic unit 41 and the image pickup element 21. The image pickup element-side optical system 83 has an incident-exiting lens 831 and guides exiting light exiting the spectroscopic unit 41 to the image pickup element 21.

As the spectroscopic measurement unit 10 has at least one of such optical systems 81, 83, the rate of condensation by the image pickup element 21 of the reflected light reflected off the image pickup target object X can be improved.

At least one of the optical systems 81, 83 may be omitted in consideration of the rate of condensation by the image pickup element 21.

The spectroscopic unit-side optical system 81 may be arranged between the spectroscopic unit 41 and the image pickup element-side optical system 83, instead of being arranged as described above (as shown in FIG. 5).

RGB Image Acquisition Unit 11

The RGB image acquisition unit 11 functions as a so-called RGB camera which directly receives reflected light reflected off the image pickup target object X without dispersing the reflected light, then picks up, or captures, an image of the reflected light over its entire wavelength range, and thus acquires a full-color RGB image in one shot.

In this embodiment, the RGB image acquisition unit 11 has an image pickup element 22 picking up an RGB image based on reflected light reflected off the image pickup target object X.

Image Pickup Element 22

The image pickup element 22 functions as a detection unit which picks up, or captures, an image based on reflected light reflected off the image pickup target object X and thus detects the reflected light reflected off the image pickup target object X.

The image pickup element 22 is arranged on the circuit board 51 arranged inside the casing of the smartphone 1 and is arranged at the back side of the smartphone 1 so as to be able to receive the reflected light reflected off the image pickup target object X, as shown in FIGS. 2 and 3.

Thus, the image pickup element 22 is arranged facing the same direction at the back side of the smartphone 1 as the light source 31 provided in the spectroscopic measurement unit 10. Therefore, light cast from the light source 31 directly onto the image pickup target object X is reflected off the image pickup target object X, and the image pickup element 22 receives this reflected light, picks up, or captures, an image thereof, and thus acquires an RGB image of the image pickup target object X.

Such an image pickup element 22 is formed of, for example, a CCD, CMOS or the like, and is formed of an RGB image pickup element so as to be able to directly receive the reflected light reflected off the image pickup target object X without dispersing the reflected light and pick up a full-color image of the reflected light over its entire wavelength range in one shot.

Image Pickup Element-Side Optical System 85

In this embodiment, the RGB image acquisition unit 11 also has an image pickup element-side optical system 85 formed of an optical component, as shown in FIG. 5.

The image pickup element-side optical system 85 is arranged between the image pickup target object X and the image pickup element 22. The image pickup element-side optical system 85 has an incident-exiting lens 851 and guides the reflected light reflected off the image pickup target object X to the image pickup element 22.

As the RGB image acquisition unit 11 has such an image pickup element-side optical system 85, the rate of condensation by the image pickup element 22 of the reflected light reflected off the image pickup target object X can be improved.

The image pickup element-side optical system 85 may be omitted in consideration of the rate of condensation by the image pickup element 22.

Control Unit 60

A control unit 60 is provided inside the casing of the smartphone 1 and is formed of, for example, one or more processors having a combination of a CPU and a memory or the like. The control unit 60 controls the operation of each part such as the light source 31, the image pickup element 21, the spectroscopic unit 41, and the image pickup element 22, that is, the operation of the entirety or each part of the spectroscopic measurement unit 10 and the RGB image acquisition unit 11, and also controls the operation of the display unit 15 and input and output of data to and from the storage unit 17. In terms of separately controlling the operation of the spectroscopic measurement unit 10 and the operation of the RGB image acquisition unit 11, it can be said that the control unit 60 is equivalent to or includes a "spectroscopic measurement unit control unit" and an "RGB image acquisition unit control unit". The control unit 60 separately controls the operation of the spectroscopic measurement unit 10, that is, the spectroscopic camera, and the operation of the RGB image acquisition unit 11, that is, the RGB camera.

More specifically, the control unit 60 reads software such as a program stored in the storage unit 17, based on an operation instruction by the user inputted to the input unit 16, that is, a condition or mode for picking up an image of the image pickup target object X, and thus controls the operations of the light source 31, the spectroscopic unit 41, the image pickup element 21, and the image pickup element 22. That is, the control unit 60 controls the operations of the spectroscopic measurement unit 10 and the RGB image acquisition unit 11. The control unit 60 thus acquires spectroscopic information and an RGB image, based on the operations. Subsequently, a complemented image of the RGB image complemented by superimposing the spectroscopic information and the RGB image together is displayed at the display unit 15.

In this embodiment, the control unit 60 has a light source control unit 601, a spectroscopic control unit 602, an image acquisition unit 603, a composition unit 604, and a display control unit 605, as shown in FIG. 5.

The light source control unit 601 is configured to control the light source 31 to turn on and off, based on an operation instruction by the user inputted to the input unit 16, specifically, a condition or mode or the like for picking up an image of the image pickup target object X.

The spectroscopic control unit 602 acquires a voltage value (input value) of a drive voltage corresponding to a spectral wavelength to be emitted, that is, a specific wavelength, based on the V-A data stored in the storage unit 17. The spectroscopic control unit 602 then outputs a command signal to apply the acquired voltage value to the electrostatic actuator 45 of the Fabry-Perot etalon filter as the spectroscopic unit 41. That is, the spectroscopic control unit 602 controls the operation of the spectroscopic unit 41 provided in the spectroscopic measurement unit 10 and specifies the magnitude of the specific wavelength of light emitted from the spectroscopic unit 41. The spectroscopic control unit 602 also detects a timing of changing the measured wavelength, changes the measured wavelength, changes the drive voltage according to the change in the measured wavelength, and determine whether to end the measurement, or the like, based on various data stored in the storage unit 17, and outputs a command signal based on the determination.

The image acquisition unit 603 causes the image pickup element 21 in the spectroscopic measurement unit 10 to acquire (pick up) amount-of-light measurement data (amount of light received) as a spectroscopic image, based on the reflected light reflected off the image pickup target object X, and subsequently causes the storage unit 17 to store the acquired spectroscopic image. When causing the storage unit 17 to store the spectroscopic image, the image acquisition unit 603 also causes the storage unit 17 to store the measured wavelength where the spectroscopic image is acquired, along with the spectroscopic image.

The image acquisition unit 603 causes the image pickup element 22 in the RGB image acquisition unit 11 to acquire amount-of-light measurement data (amount of light received) for each of an R-component, a G-component, and a B-component, as an RGB image, based on the reflected light reflected off the image pickup target object X, and subsequently causes the storage unit 17 to store the acquired RGB image.

The composition unit 604 acquires the spectroscopic information of the image pickup target object X and the RGB image of the image pickup target object X stored in the storage unit 17, subsequently superimposes the spectroscopic information on the RGB image, and thus composes a complemented image of the RGB image completed with the spectroscopic information.

The acquisition of the spectroscopic image, its measured wavelength, and the RGB image by the composition unit 604 can also be carried out directly from the image acquisition unit 603 without using the storage unit 17.

The display control unit 605 causes the display unit 15 to display, as a visualized image, the complemented image of the image pickup target object X composed by the superimposition of the spectroscopic information and the RGB image by the composition unit 604.

In the control unit 60 of such a configuration, the light source control unit 601, the spectroscopic control unit 602, and the image acquisition unit 603 together form a spectroscopic measurement unit control unit controlling the operations of the light source 31, the spectroscopic unit 41, and the image pickup element 21, and the operation of the spectroscopic measurement unit 10. The image acquisition unit 603 forms an RGB image acquisition unit control unit controlling the operation of the image pickup element 22, that is, the operation of the RGB image acquisition unit 11.

Using the smartphone 1 as described above, that is, the smartphone 1 having the RGB camera and the spectroscopic camera, an image of the image pickup target object X is picked up and a complemented image generated by superimposing spectroscopic information on an RGB image is acquired. Thus, a high-definition image can be displayed at the display unit 15. A method for displaying a complemented image at the display unit 15 using the smartphone 1, that is, a display method to which the image processing method according to the present disclosure is applied, will now be described.

Method for Displaying Complemented Image

The method for displaying a complemented image using the smartphone 1 includes: an image pickup step of picking up an RGB image of the image pickup target object X and picking up a spectroscopic image of the image pickup target object X in a predetermined wavelength range, and thus acquiring spectroscopic information peculiar to the image pickup target object X in the wavelength range; and a display step of displaying a complemented image complemented by superimposing the spectroscopic information on the RGB image.

<1> First, the user operates the input unit 16 to start up an application to acquire an image of the image pickup target object X using the smartphone 1 and subsequently selects a condition such as a mode for picking up an image of the image pickup target object X according to need, in response to an instruction from the application (S1).

The condition inputted in response to an instruction from the application includes the shutter speed, image pickup range, and whether to turn on the light source or not, in addition to the mode. Inputting the condition such as the mode in this way sets a wavelength range where spectroscopic information picked up to complement an RGB image is acquired. That is, a predetermined wavelength range of the spectroscopic information acquired by the spectroscopic measurement unit 10 is selected, which will be described in detail later.

<2> Next, the user operates the input unit 16 to give an input instruction to pick up an image of the image pickup target object X by the smartphone 1, that is, by the spectroscopic measurement unit 10 and the RGB image acquisition unit 11. That is, the user presses the shutter of the smartphone 1.

Based on this input instruction, the control unit 60 controls the operations of the spectroscopic measurement unit 10 and the RGB image acquisition unit 11 and picks up, or captures, an image of the image pickup target object X, that is, acquires a spectroscopic image by the spectroscopic measurement unit 10 and an RGB image by the RGB image acquisition unit 11.

The acquisition of a spectroscopic image by the spectroscopic measurement unit 10<2A> and the acquisition of an RGB image by the RGB image acquisition unit 11<2B> will now be described in order.

<2A> First, the spectroscopic measurement unit 10 picks up, or captures, a spectroscopic image of the image pickup target object X in a predetermined wavelength range, based on the condition such as the mode inputted by the user in the step <1>, and thus acquires spectroscopic information peculiar to the image pickup target object X in the wavelength range.

<2A-1> First, in response to the input instruction to pick up an image of the image pickup target object X from the user at the input unit 16, the light source control unit 601 turns on the light source 31 (S2).

As the light source 31 is turned on, illuminating light emitted from the light source 31 is cast onto the image pickup target object X. The cast light is reflected off the image pickup target object X. The reflected light becomes incident on the spectroscopic unit 41 as incident light.

The illuminating light emitted from the light source 31 when the light source 31 is turned on is used for the acquisition of a spectroscopic image by the spectroscopic measurement unit 10 and is also used for the acquisition of an RGB image by the RGB image acquisition unit 11<2B>, described later.

<2A-2> Next, the spectroscopic control unit 602 acquires a voltage value (input value) of a drive voltage corresponding to a spectral wavelength to be emitted, that is, a specific wavelength, based on the V-A data stored in the storage unit 17. The spectroscopic control unit 602 then outputs a command signal to apply the acquired voltage value to the electrostatic actuator 45 of the Fabry-Perot etalon filter as the spectroscopic unit 41 (S3A).

Thus, the light having the specific wavelength, of the light incident on the spectroscopic unit 41 as incident light from the image pickup target object X, is selectively emitted as exiting light toward the image pickup element 21.

Preferably, the spectroscopic control unit 602 performs adjustment processing to calibrate the spectroscopic unit 41 before causing the spectroscopic unit 41 to emit the light having the specific wavelength. Thus, a spectrum $s_{ref}$ of the light source 31 is acquired.

<2A-3> Next, the image acquisition unit 603 controls the operation of the image pickup element 21 and thus acquires the light having the specific wavelength emitted as the exiting light from the spectroscopic unit 41, as a spectroscopic image via the image pickup element 21. That is, the image acquisition unit 603 acquires amount-of-light measurement data (amount of light received) of the light having the specific wavelength, of the reflected light reflected off the image pickup target object X, as a spectroscopic image via the image pickup element 21. The image acquisition unit 603 then causes the storage unit 17 to store the acquired spectroscopic image along with the measured wavelength corresponding to this spectroscopic image, that is, the specific wavelength (S4A).

In such a method for acquiring a spectroscopic image, the spectroscopic unit 41 is arranged on the optical axis of the light received by the image pickup element 21, between the image pickup target object X and the image pickup element 21. Thus, only the light having the specific wavelength, of the light reflected off the image pickup target object X, is transmitted at the spectroscopic unit 41, and the intensity of the light of this specific wavelength is spectroscopically measured as a spectroscopic image by the image pickup element 21.

<2A-4> Next, after the acquisition of a spectroscopic image based on the light having the first specific wavelength, whether the acquisition of a spectroscopic image based on light having a second specific wavelength that is different from the first specific wavelength is needed or not is determined, based on the condition or the like selected by the user in the step <1>. That is, whether a spectroscopic image based on light having a second specific wavelength that is different from the first specific wavelength needs to be sequentially acquired or not is determined (S5A).

When it is determined by the determination (S5A) that a spectroscopic image based on light having a second specific wavelength needs to be acquired, the steps <2A-2> to <2A-4> are repeated on the light having the second specific wavelength instead of the light having the first specific wavelength. That is, the voltage value applied between the fixed electrode 412 and the moving electrode 422 in the electrostatic actuator 45 is changed to set the second specific wavelength, and then the steps <2A-2> to <2A-4> are repeated. Thus, a spectroscopic image based on the light having the second specific wavelength is acquired. Such acquisition of a spectroscopic image based on the light having the second specific wavelength, that is, a different specific wavelength, is repeated from the first, second to n-th specific wavelength. The steps <2A-2> to <2A-4> are repeated to acquire a plurality of spectroscopic images having different specific wavelengths as described above, and these spectroscopic images are subsequently superimposed together. Thus, the spectroscopic information can be acquired as spectral information $s_{sam}$ representing the relationship between each specific wavelength and light intensity, corresponding to each pixel included in the spectroscopic images.

In other words, for example, in FIG. 8, where the predetermined wavelength range is from 400 nm and higher to 760 nm and lower, which is a variable light wavelength range, the spectroscopic information, that is, the spectral information $s_{sam}$, is expressed as a graph showing the relationship between each of n-divided specific wavelengths and light intensity in this wavelength range from 400 nm and higher to 760 nm and lower. This graph, that is, the spectral information, is acquired as the total spectroscopic information held at each pixel of M rows by N columns.

The wavelength range where the spectral information $s_{sam}$ is acquired, that is, the wavelength range of the spectroscopic image picked up by the spectroscopic measurement unit 10, is set according to the condition such as the mode selected in the step <1>.

Specifically, for example, when a mode for high image quality is selected in the step <1>, the wavelength range of the spectroscopic image picked up by the spectroscopic measurement unit 10 is set to a range including a yellow visible light range, that is, approximately from 570 nm and higher to 590 nm and lower. Thus, spectroscopic information having a Y-component is superimposed on an RGB image having an R-component, a G-component, and a B-component. A complemented image resulting from these can be composed as a high-quality image, that is, a high-definition image.

When a mode for photographing a starlit sky is selected in the step <1>, the wavelength range of the spectroscopic image picked up by the spectroscopic measurement unit 10 is set to a range including a near-infrared range, preferably, the wavelength of H-alpha rays, that is, approximately 656.28 nm. Thus, spectroscopic information having a component in the near-infrared range is superimposed on an RGB image having an R-component, a G-component, and a B-component. Therefore, a complemented image resulting from these can be composed as an image in which a constellation and even a nebula can be recognized.

Meanwhile, when there is no need to acquire spectroscopic image of light having a predetermined wavelength, the acquisition of a spectroscopic image by the spectroscopic measurement unit 10 ends. Also, the image acquisition unit 603 causes the storage unit 17 to store the spectroscopic information, that is, the spectral information $s_{max}$ and subsequently shifts to the next step <3>.

<2B> Next, the RGB image acquisition unit 11 picks up, or captures, an RGB image of the image pickup target object X.

<2B-1> First, the illuminating light emitted from the light source 31 when turning on in the step <2A-1> is cast onto the image pickup target object X (S2).

The cast light is reflected off the image pickup target object X. The light reflected off the image pickup target object X becomes incident on the image pickup element 22 as incident light.

<2B-2> Next, the image acquisition unit 603 controls the operation of the image pickup element 22 and thus acquires an RGB image from the image pickup element 22, based on the light incident on the image pickup element 22 as incident light from the image pickup target object X. That is, the image acquisition unit 603 acquires amount-of-light measurement data (amount of light received) in the entire wavelength range of the reflected light reflected off the image pickup target object X as an RGB image including an R-component, a G-component, and a B-component from the image pickup element 22. The image acquisition unit 603 then causes the storage unit 17 to store the acquired RGB image (S3B).

<2B-3> Next, whether the RGB image acquired in the step <2B-2> is stored in the storage unit 17 or not is determined (S4B).

When it is determined by the determination (S4B) that the RGB image is not stored in the storage unit 17 due to a certain factor, the steps <2B-2> to <2B-3> are repeated. The step <2B-3> of checking the RGB image stored in the storage unit 17 enables the RGB image acquisition unit 11 to securely acquire the RGB image.

Meanwhile, when it is confirmed that the RGB image is stored in the storage unit 17, the acquisition of the RGB image by the RGB image acquisition unit 11 ends and the processing shifts to the next step <3>.

Picking up an RGB image of the image pickup target object X and picking up a spectroscopic image of the image pickup target object X in a predetermined wavelength range via the steps <2A> and <2B>, as described above, forms the image pickup step of acquiring spectroscopic information peculiar to the image pickup target object X in the wavelength range.

As for the timing of the acquisition of a spectroscopic image by the spectroscopic measurement unit 10 in the step <2A> and the acquisition of an RGB image by the RGB image acquisition unit 11 in the step <2B>, it is preferable that the time of executing the step <2A> includes the time of executing the step <2B> because the spectroscopic measurement unit 10 needs to acquire a plurality of spectroscopic images in the step <2A>. Thus, the occurrence of an image distortion of the resulting complemented image due to a camera shake or the like can be restrained or prevented.

<3> Next, the composition unit 604 acquires the spectroscopic information, that is, the spectral information $s_{sam}$, and the RGB image, stored in the storage unit 17, subsequently superimposes the spectroscopic information on the RGB image, and thus composes a complemented image of the RGB image complemented with the spectroscopic information (S6).

<3-1> First, the composition unit 604 acquires the spectroscopic information, that is, the spectral information $s_{sam}$, stored in the storage unit 17, and subsequently converts the spectral information $s_{sam}$ into tristimulus values prescribed by the International Commission on Illumination (CIE), that is, X, Y, Z values. These X, Y, Z values are then converted into R, G, B values, using a monitor profile corresponding to the display unit 15. In this specification, these R, G, B values may also be referred to as "R, G, B values (I)".

<3-2> Next, the composition unit 604 acquires the RGB image stored in the storage unit 17 and subsequently converts the RGB image into tristimulus values prescribed by the International Commission on Illumination (CIE), that is, X, Y, Z values. These X, Y, Z values are then converted into R, G, B values, using a monitor profile corresponding to the display unit 15. In this specification, these R, G, B values may also be referred to as "R, G, B values (II)".

<3-3> Next, the composition unit 604 superimposes the R, G, B values (I) acquired based on the spectroscopic information, on the R, G, B values (II) acquired based on the RGB image, and thus composes superimposed R, G, B values (III), that is, a complemented image.

In this case, when complemented image R, G, B values (III) at a position G(3,3) in three rows by three columns are defined as R' (3,3), G' (3,3), B' (3,3), these values are found, for example, by the following manner.

First, when the image pickup element 22 in the RGB image acquisition unit 11 is an RGB image pickup element of a Bayer layout, each component of the R, G, B values (II) acquired based on the RGB image at the position G(3,3) can be expressed by R(3,3)=(R(2,3)+R(4,3))/2, G(3,3), and B(3,3)=(B(3,2))+B(3,4))/2.

Then, correction coefficients α, β, γ for correcting the R-component, G-component, and B-component, respectively, are calculated using each component of the R, G, B values (I) acquired based on the spectroscopic information at the position G(3,3). Subsequently, the products of these correction coefficients and the respective components of the R, G, B values (II) are calculated. That is, R' (3,3)=αR(3,3), G'(3,3)=βG(3,3), and B' (3,3)=γB(3,3) are calculated to find complemented image R, G, B values (III) at the position G(3,3).

Other than composing the complemented image as described above, when the RGB output sensitivities to the acquired wavelength at the display unit 15 are r, g, b, the correction coefficient is p, and the spectral information $s_{sam}$ at the position G(3,3) is S(3,3) in the step <3-1>, the complemented image R, G, B values (III) can be found using the following equation (1):

$$\begin{pmatrix} R'(3,3) \\ G'(3,3) \\ B'(3,3) \end{pmatrix} = p \begin{pmatrix} R(3,3) \\ G(3,3) \\ B(3,3) \end{pmatrix} + (1-p) \begin{pmatrix} r \\ g \\ b \end{pmatrix} S(3,3). \quad (1)$$

By the steps <3-1> to <3-3> as described above, a complemented image to be displayed at the display unit 15 can be acquired as R, G, B values (III) in the next step <4>. Therefore, in the next step <4>, preparing a display unit configured to display a complemented image in an RGB representation, as the display unit 15 displaying an image, enables the R, G, B values (III) acquired as a complemented image to be displayed as a high-definition image.

When the mode for photographing a starlit sky is selected in the step <1>, the wavelength range of the spectroscopic image picked up by the spectroscopic measurement unit 10 is set to a range including a near-infrared range. In this case, the R, G, B values (I) include the R-component alone. Therefore, the R, G, B values (III) are the result of correcting the R-component of the R, G, B values (II) with the R-component of the R, G, B values (I). That is, it can be said that the complemented image results from correcting the R-component of the RGB image, using the spectroscopic information.

When the mode for high image quality is selected in the step <1>, the wavelength range of the spectroscopic image picked up by the spectroscopic measurement unit 10 is set to a range including a yellow visible light range. In this case, the R, G, B values (I) include the R-component and the G-component. Therefore, the R, G, B values (III) are the result of correcting the R-component and the G-component of the R, G, B values (II) with the R-component and the G-component of the R, G, B values (I), respectively. That is, it can be said that the complemented image results from correcting the R-component and the G-component of the RGB image, using the spectroscopic information.

More specifically, the correction coefficients α, β, are calculated based on the R, G, B values (I), in order to find R'(3,3) and G'(3,3), of R'(3,3), G'(3,3), B'(3,3), which are the complemented image R, G, B values (III) at the position G(3,3) in the three rows by three columns. Then, R'(3,3) and G'(3,3) are calculated, based on R'(3,3)=αR(3,3) and G'(3,3)=βG(3,3) using these correction coefficients α, β. When the R, G, B values (I) has no sensitivity to the B-component, B'(3,3) is calculated, based on γ=1, that is, B'(3,3)=B(3,3).

Also, in the next step <4>, the display unit 15 displaying an image is not limited to being configured to display a complemented image in an RGB representation and may be configured to display a complemented image by RGBY display. When the display unit 15 is thus configured to display a complemented image by RGBY display and the mode for high image quality is selected in the step <1>, the complemented image can be composed in the following manner.

That is, in the step <3-1>, the composition unit 604 converts the X, Y, Z values acquired based on the spectral information $s_{sam}$ into a Y value instead of converting the X, Y, Z values into R, G, B values, using monitor profile corresponding to the display unit 15. Then, in the step <3-3>, the composition unit 604 may superimpose the Y value acquired based on the spectroscopic information, on the R, G, B values (II) acquired based on the RGB image, and thus composite the superimposed R, G, B, Y values, that is, the complemented image.

<4> Next, the display control unit 605 causes the display 70 having the display unit 15 to display the complemented image composed in the step <3> (S7).

This complemented image is composed based on the RGB image and the spectroscopic information in the step <3> so as to be able to be displayed as a high-definition image at the display unit 15. Therefore, the image displayed at the display unit 15 can be provided as a high-definition image.

The complemented image may be printed by a communicatively coupled printer or the like, using the communication function of the smartphone 1, and thus displayed as a printed object, as well as being displayed at the display 70 having the display unit 15, as described above.

In this case, the monitor profile prepared in the steps <3-1> and <3-2> is made to corresponds to the printer used, and the complemented image to be displayed as a printed object is acquired as C, M, Y, K values. Thus, the complemented image can be displayed with high definition on a printed object printed in a CMY representation.

The steps <3> and <4>, as described above, form the display step of displaying a complemented image complemented by superimposing spectroscopic information on an RGB image.

By the steps <1> to <4>, as described above, image pickup of the image pickup target object X using the smartphone 1 is carried out.

In this embodiment, the case where the spectroscopic measurement unit 10 has the light source 31, the spectroscopic unit 41, and the image pickup element 21 is described. However, the light source 31, of these components, may be omitted from the spectroscopic measurement unit 10. In this case, in the step <2A> of picking up a spectroscopic image by the spectroscopic measurement unit 10 and the step <2B> of picking up an RGB image by the RGB image acquisition unit 11, external light such as sunlight or indoor illumination is cast onto the image pickup target object X.

In this embodiment, it is assumed that the information system according to the present disclosure is completed single-handedly by an information terminal, and the smartphone 1 is employed as an example. However, such an information terminal is not limited to the smartphone 1 and may be, for example, a tablet terminal, notebook personal computer, digital camera, digital video camera, drive recorder or the like. Completing the information system according to the present disclosure single-handedly by an information Therefore, the information system can be used even in a place where communication is unstable.

In this embodiment, the case where the input unit 16 is formed of a touch panel is described. However, the input unit 16 is not limited to this and may be an operation button provided on the casing of the smartphone 1. Alternatively, an audio input may be made via a microphone provided in the smartphone 1. Also, these may be combined together.

Second Embodiment

A second embodiment of the information system according to the present disclosure will now be described.

Figure 9:
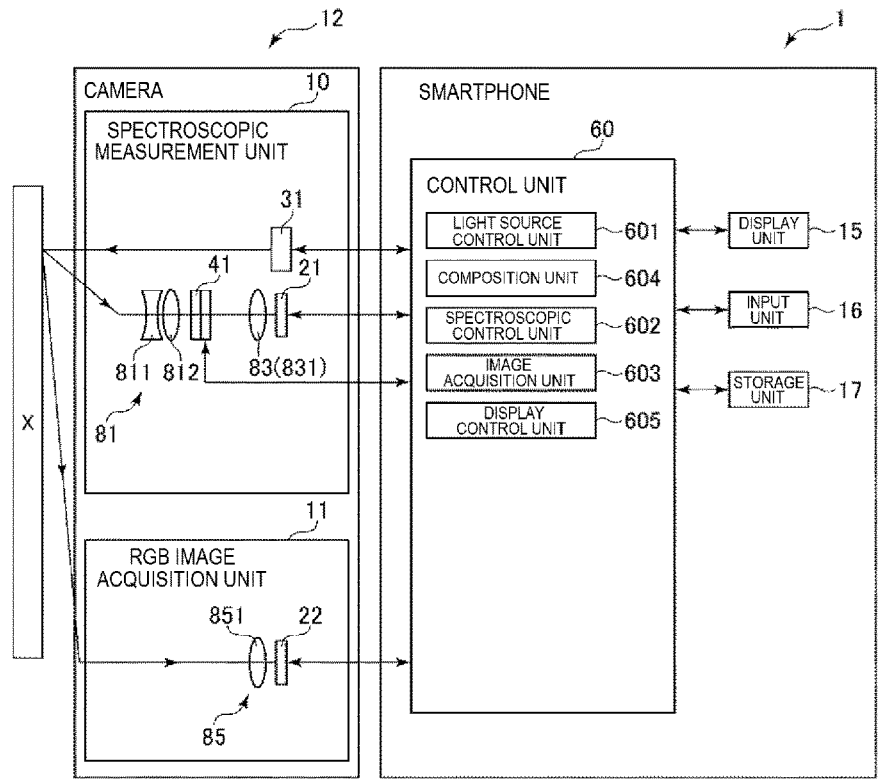
FIG. 9 is a block diagram showing a schematic configuration of a smartphone and a camera to which a second embodiment of the information system according to the present disclosure is applied.

FIG. 9 is a block diagram showing a schematic configuration of a smartphone and a camera to which the second embodiment of the information system according to the present disclosure is applied.

The information system according to the second embodiment is described below, mainly in terms of its difference from the information system according to the first embodiment. The description of similar matters is omitted.

The information system according to the second embodiment shown in FIG. 9 is similar to the information system according to the first embodiment, except for having an independent camera 12 including the spectroscopic measurement unit 10 and the RGB image acquisition unit 11, in addition to the smartphone 1 as an information terminal, and except that the spectroscopic measurement unit 10 in the camera 12 has the function of a spectroscopic camera and that the RGB image acquisition unit 11 has the function of an RGB camera. That is, in the information system according to the second embodiment, the information system according to the present disclosure is not completed single-handedly by the smartphone 1, which is an information terminal, but has the smartphone 1 as an information terminal and the camera 12 having both the function of a spectroscopic camera and the function of an RGB camera.

In the information system according to the second embodiment, the internal arrangement of the spectroscopic measurement unit 10 and the RGB image acquisition unit 11 is omitted from the smartphone 1, and instead, the spectroscopic measurement unit 10 and the RGB image acquisition unit 11 are provided as the camera 12 having both the function of a spectroscopic camera and the function of an RGB camera, independent of and outside the smartphone 1, as shown in FIG. 9. The operation of the camera 12 can be controlled by the smartphone 1. The control of the camera 12, that is, the control of the spectroscopic measurement unit 10 and the RGB image acquisition unit 11, by the smartphone 1 via electrical coupling between the smartphone 1 and the camera 12 may be wired or wireless.

In the information system according to the second embodiment of such a configuration, the acquisition of an image including the image pickup target object X by the camera 12 and the operation to compose a complemented image including the image pickup target object X by the smartphone 1, or the like, can be carried out independently of each other. This can improve the operability of the information system.

Installing an application in the smartphone 1 and coupling the smartphone 1 to the camera 12 having the spectroscopic measurement unit 10 and the RGB image acquisition unit 11 enables the use of the information system according to the present disclosure. This achieves high versatility to be able to use the smartphone 1 that does not have the camera 12.

Also, since the information system according to the present disclosure is completed by the smartphone 1 and the camera 12, offline use is available except for the communication between the smartphone 1 and the camera 12. Therefore, the information system can be used even in a place where communication is unstable.

Such an information system according to the second embodiment achieves effects similar to those of the first embodiment.

In this embodiment, the case where the information system according to the present disclosure has the smartphone 1 as an information terminal and the camera 12 having both the function of a spectroscopic camera and the function of an RGB camera is described. However, in the information system according to the present disclosure, the information terminal may be formed of a tablet terminal or the like instead of the smartphone 1. Also, the smartphone 1, that is, the information terminal, may be formed of a server or the like.

Third Embodiment

A third embodiment of the information system according to the present disclosure will now be described.

Figure 10:
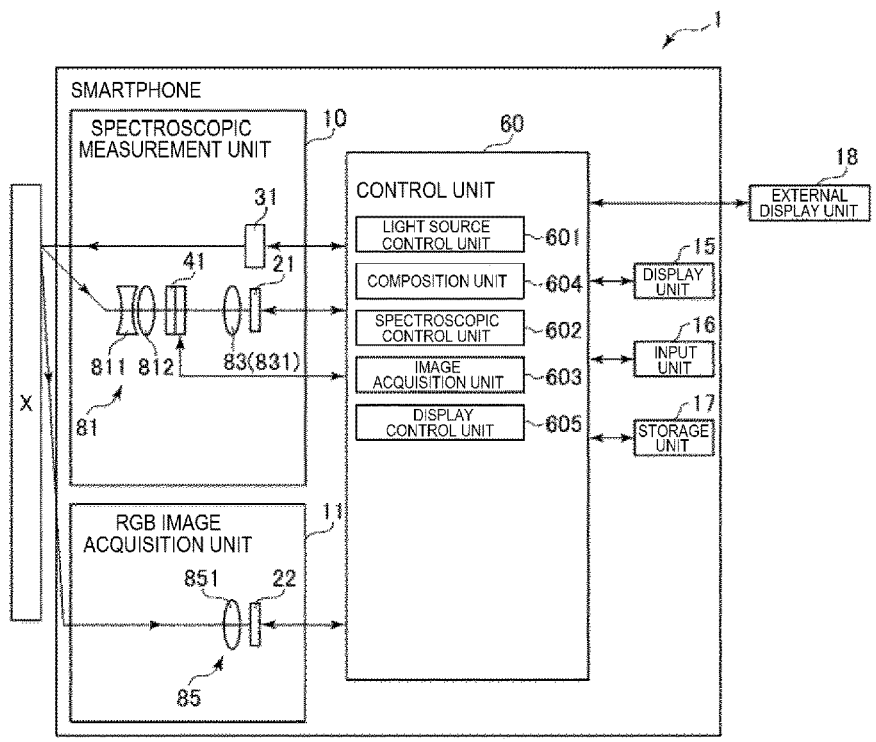
FIG. 10 is a block diagram showing a schematic configuration of a smartphone and an external display unit to which a third embodiment of the information system according to the present disclosure is applied.

FIG. 10 is a block diagram showing a schematic configuration of a smartphone and an external display unit to which the third embodiment of the information system according to the present disclosure is applied.

The information system according to the third embodiment is described below, mainly in terms of its difference from the information system according to the first embodiment. The description of similar matters is omitted.

The information system according to the third embodiment shown in FIG. 10 is similar to the information system according to the first embodiment, except for having an independent external display unit 18 in addition to the smartphone 1 as an information terminal and except that the external display unit 18 has the function of a display unit outside the smartphone 1. That is, in the information system according to the third embodiment, the information system according to the present disclosure is not completed single-handedly by the smartphone 1, which is an information terminal, but has the smartphone 1 as an information terminal and the external display unit 18.

The information system according to the third embodiment has the external display unit 18 independently provided outside the smartphone 1, in addition to the display unit 15 provided in the smartphone 1, as shown in FIG. 10. The operation of the external display unit 18 can be controlled by the smartphone 1. The control of the external display unit 18 by the smartphone 1 via electrical coupling between the smartphone 1 and the external display unit 18 may be wired or wireless.

In the information system according to the third embodiment of such a configuration, the check of an image at the external display unit 18 by the operator and the operation of setting a condition for specifying the image pickup target object X or the like via the smartphone 1 can be carried out independently of each other. This can improve the operability of the information system.

Also, since the information system according to the present disclosure is completed by the smartphone 1 and the external display unit 18, offline use is available except for the communication between the smartphone 1 and the external display unit 18. Therefore, the information system can be used even in a place where communication is unstable.

The external display unit 18 may be a mobile notebook PC, tablet terminal, head-up display (HUD), head-mounted display (HMD) or the like. Particularly, a head-mounted display is preferable. The head-mounted display can display, for example, the result of specifying the image pickup target object X and the position where the image pickup target object X is considered to be present and the like in augmented reality (AR), and can also be used hands-free. This can further improve the operability of the information system.

Such an information system according to the third embodiment achieves effects similar to those of the first embodiment.

Fourth Embodiment

A fourth embodiment of the information system according to the present disclosure will now be described.

Figure 11:
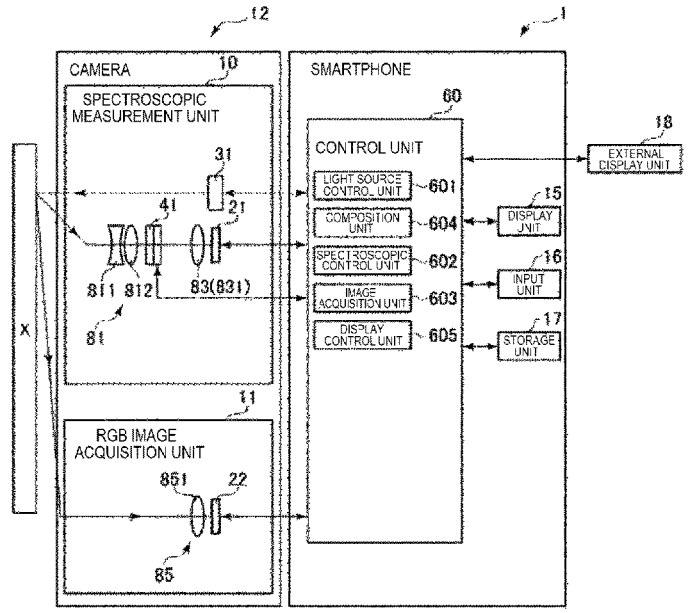
FIG. 11 is a block diagram showing a schematic configuration of a smartphone and an external display unit to which a fourth embodiment of the information system according to the present disclosure is applied.

FIG. 11 is a block diagram showing a schematic configuration of a smartphone, a camera, and an external display unit to which the fourth embodiment of the information system according to the present disclosure is applied.

The information system according to the fourth embodiment is described below, mainly in terms of its difference from the information system according to the first embodiment. The description of similar matters is omitted.

The information system according to the fourth embodiment shown in FIG. 11 is similar to the information system according to the first embodiment, except for having an independent camera 12 and an independent external display unit 18 in addition to the smartphone 1 as an information terminal, and except that the camera 12 has spectroscopic measurement unit 10 and the RGB image acquisition unit 11, with the spectroscopic measurement unit 10 having the function of a spectroscopic camera and the RGB image acquisition unit 11 having the function of an RGB camera, and that the external display unit 18 has the function of a display unit outside the smartphone 1. That is, in the information system according to the fourth embodiment, the information system according to the present disclosure is not completed single-handedly by the smartphone 1, which is an information terminal, but has the smartphone 1 as an information terminal, the camera 12 having both the function of a spectroscopic camera and the function of an RGB camera, and the external display unit 18.

In the information system according to the fourth embodiment, the internal arrangement of the spectroscopic measurement unit 10 and the RGB image acquisition unit 11 is omitted from the smartphone 1, and instead, the spectroscopic measurement unit 10 and the RGB image acquisition unit 11 are provided as the camera 12 having both the function of a spectroscopic camera and the function of an RGB camera, independent of and outside the smartphone 1, as shown in FIG. 11. The operation of the camera 12 can be controlled by the smartphone 1. Also, the information system according to the fourth embodiment has the external display unit 18 provided independently of and outside the smartphone 1, in addition to the display unit 15 provided in the smartphone 1. The operation of the external display unit 18 can be controlled by the smartphone 1.

The control of the camera 12, that is, the control of the spectroscopic measurement unit 10 and the RGB image acquisition unit 11, by the smartphone 1 via electrical coupling between the smartphone 1 and the camera 12, and the control of the external display unit 18 by the smartphone 1 via electrical coupling between the smartphone 1 and the external display unit 18 may be wired or wireless.

In the information system according to the fourth embodiment of such a configuration, the acquisition of an image including the image pickup target object X by the camera 12, the check of an image at the external display unit 18 by the operator, and the operation to compose a complemented image including the image pickup target object X or the like by the smartphone 1, or the like, can be carried out independently of each other. This can improve the operability of the information system.

Installing an application in the smartphone 1 and coupling the camera 12 and the external display unit 18 together enables the use of the information system according to the present disclosure. This achieves high versatility to be able to use the smartphone 1 that does not have the camera 12 and the external display unit 18.

Also, since the information system according to the present disclosure is completed by the smartphone 1, the camera 12, and the external display unit 18, offline use is available except for the communication between the smartphone 1, the camera 12, and the external display unit 18. Therefore, the information system can be used even in a place where communication is unstable.

The external display unit 18 may be a mobile notebook PC, tablet terminal, head-up display (HUD), head-mounted display (HMD) or the like. Particularly, a head-mounted display is preferable. The head-mounted display can be used hands-free in augmented reality (AR). This can further improve the operability of the information system.

Such an information system according to the fourth embodiment achieves effects similar to those of the first embodiment.

In this embodiment, the case where the information system according to the present disclosure has the smartphone as an information terminal, the camera 12 having the spectroscopic measurement unit 10 and the RGB image acquisition unit 11, and the external display unit 18 such as a head-mounted display, is described. However, the information system according to the present disclosure may have a tablet terminal or the like as an information terminal, instead of the smartphone 1, and may also have a server or the like instead of the smartphone 1, that is, an information terminal.

In this embodiment, the case where the information system according to the present disclosure has the camera 12 and the external display unit 18 independent of each other as shown in FIG. 11 is described. However, this is not limiting. The camera 12 and the external display unit 18 may be formed as a unified configuration.

Fifth Embodiment

A fifth embodiment of the information system according to the present disclosure will now be described.

Figure 12:
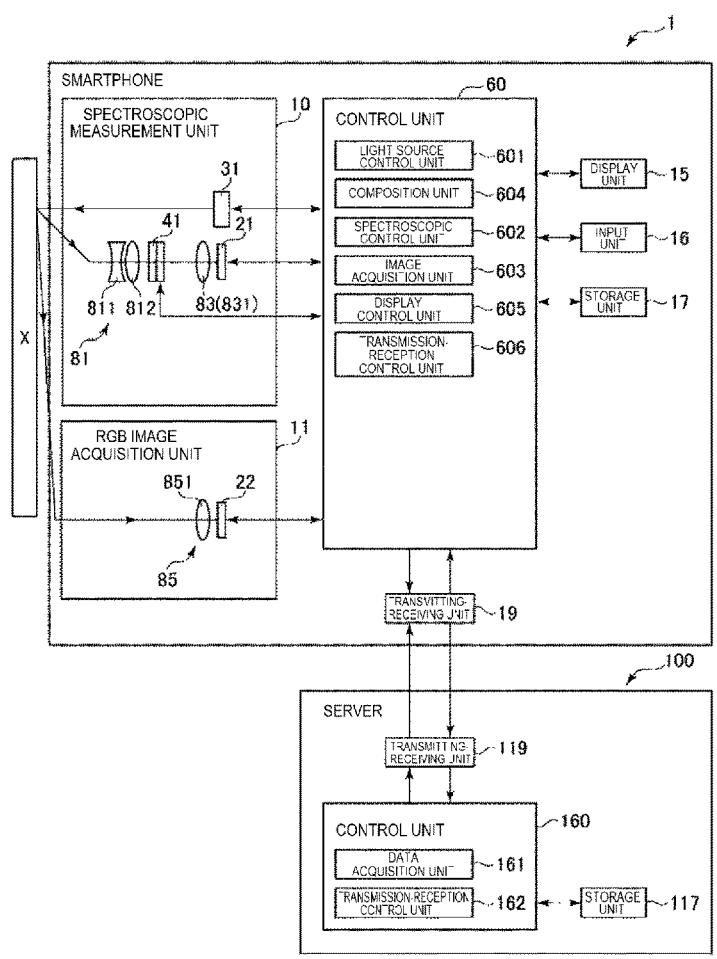
FIG. 12 is a block diagram showing a schematic configuration of a smartphone and a server to which a fifth embodiment of the information system according to the present disclosure is applied.

FIG. 12 is a block diagram showing a schematic configuration of a smartphone and a server to which the fifth embodiment of the information system according to the present disclosure is applied.

The information system according to the fifth embodiment is described below, mainly in terms of its difference from the information system according to the first embodiment. The description of similar matters is omitted.

The information system according to the fifth embodiment shown in FIG. 12 is similar to the information system according to the first embodiment, except for having an independent server 100 in addition to the smartphone 1 as an information terminal. That is, in the information system according to the fifth embodiment, the information system according to the present disclosure is not completed single-handedly by the smartphone 1, which is an information terminal, but has the smartphone 1 as an information terminal and the server 100.

In the information system according to the fifth embodiment, the smartphone 1 also has a transmitting-receiving unit 19, and the control unit 60 has a transmission-reception control unit 606 controlling the operation of the transmitting-receiving unit 19, as shown in FIG. 12.

The server 100 has a storage unit 117, a transmitting-receiving unit 119, and a control unit 160. The control unit 160 has a data acquisition unit 161 and a transmission-reception control unit 162 controlling the operations of the storage unit 117 and the transmitting-receiving unit 119, respectively.

In the information system according to this embodiment of such a configuration, the storage of a database for specifying the image pickup target object X is omitted from the storage unit 17 provided in the smartphone 1. This database is instead stored in the storage unit 117 provided in the server 100.

The database is transferred between the transmitting-receiving unit 19 provided in the smartphone 1 and the transmitting-receiving unit 119 provided in the server 100. That is, the transmitting-receiving unit 19 transmits, to the transmitting-receiving unit 119, a request to acquire the database from the storage unit 117, and receives the database from the server 100 via the transmitting-receiving unit 119. The transmitting-receiving unit 119 receives, from the transmitting-receiving unit 19, the request to acquire the database from the storage unit 117, and transmits the database to the smartphone 1 via the transmitting-receiving unit 19. The transfer of the database between the transmitting-receiving unit 19 and the transmitting-receiving unit 119 may be carried out via wired or wireless communication. In the case of wireless communication, it may be via the internet.

The transmission-reception control unit 606 provided in the control unit 60 of the smartphone 1 controls the operation of the transmitting-receiving unit 19 to receive the database from the server 100 via the transmitting-receiving unit 119. The spectroscopic control unit 602 receives the database from the transmission-reception control unit 606, and controls the operation of the spectroscopic measurement unit 10, based on this database, to pick up a spectroscopic image.

The data acquisition unit 161 provided in the control unit 160 of the server 100 acquires the database stored in the storage unit 117 in response to the acquisition request and subsequently transfers the database to the transmission-reception control unit 162. The transmission-reception control unit 162 controls the operation of the transmitting-receiving unit 119 to transfer the database from the server 100 to the smartphone 1 via the transmitting-receiving unit 19.

In the information system according to the fifth embodiment of such a configuration, the information system is not completed single-handedly by the smartphone 1, which is an information terminal, but also has the server 100. The database is saved in the storage unit 117 provided in the server 100. The database is transmitted to the smartphone 1 via the transmitting-receiving units 19, 119 when a spectroscopic image is picked up. This is advantageous in that the storage unit 17 in the smartphone 1 need not store a large amount of data. Also, when the information system has a plurality of smartphones 1, the database can be shared among the smartphones 1. Moreover, simply updating the database provided in the storage unit 117 in the server 100 can enable each smartphone 1 to use the latest version of the database.

In the information system according to the present disclosure, for the smartphone 1 to specify the image pickup target object X offline, a necessary database may be stored into the storage unit 17 in the smartphone 1 from the storage unit 117 in the server 100 when offline. Thus, even when offline, the smartphone 1 can specify the image pickup target object X.

Such an information system according to the fifth embodiment achieves effects similar to those of the first embodiment.

In this embodiment, the case where the information system according to the present disclosure has the smartphone 1 as an information terminal and the server 100 is described. However, in the information system according to the present disclosure, the information terminal may be formed of a tablet terminal or the like instead of the smartphone 1. Also, the smartphone 1, that is, the information terminal, may be formed of a digital camera, digital video camera, head-up display (HUD), head-mounted display (HMD), or the like.

In this embodiment, the control unit 60 provided in the smartphone 1 has the light source control unit 601, the spectroscopic control unit 602, the image acquisition unit 603, the composition unit 604, and the display control unit 605, as in the first embodiment. However, at least one of these may be provided in the control unit 160 in the server 100.

Sixth Embodiment

A sixth embodiment of the information system according to the present disclosure will now be described.

Figure 13:
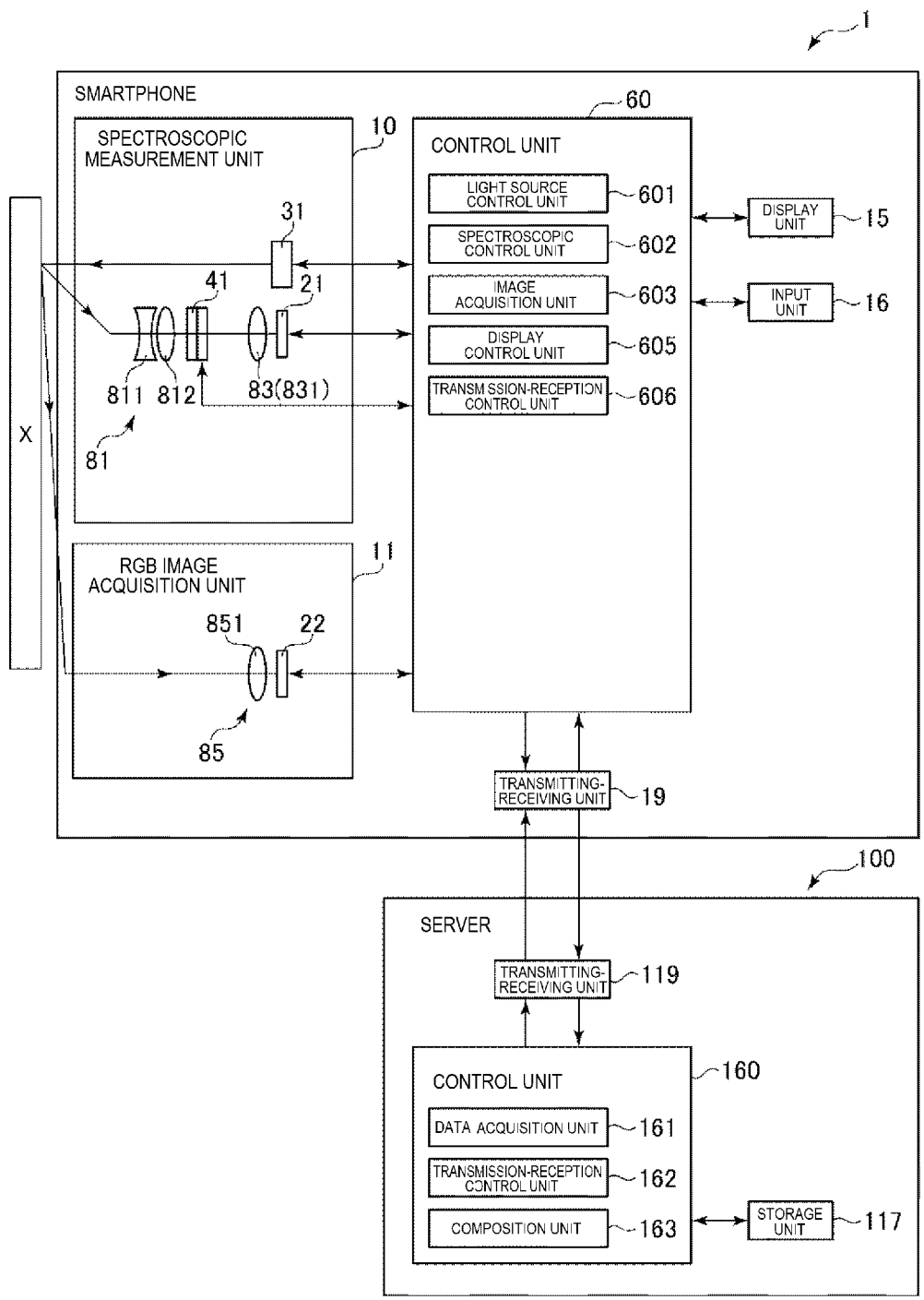
FIG. 13 is a block diagram showing a schematic configuration of a smartphone and a server to which a sixth embodiment of the information system according to the present disclosure is applied.

FIG. 13 is a block diagram showing a schematic configuration of a smartphone and a server to which the sixth embodiment of the information system according to the present disclosure is applied.

The information system according to the sixth embodiment is described below, mainly in terms of its difference from the information system according to the first embodiment. The description of similar matters is omitted.

The information system according to the sixth embodiment shown in FIG. 13 is similar to the information system according to the first embodiment, except for having an independent server 100 in addition to the smartphone 1 as an information terminal. That is, in the information system according to the sixth embodiment, the information system according to the present disclosure is not completed single-handedly by the smartphone 1, which is an information terminal, but has the smartphone 1 as an information terminal and the server 100.

In the information system according to the sixth embodiment, the smartphone 1 does not have the storage unit and the composition unit in the control unit 60. The smartphone 1 instead has a transmitting-receiving unit 19, and the control unit 60 has a transmission-reception control unit 606 controlling the operation of the transmitting-receiving unit 19, as shown in FIG. 13.

The server 100 has a storage unit 117, a transmitting-receiving unit 119, and a control unit 160. The control unit 160 has a data acquisition unit 161 and a transmission-reception control unit 162 controlling the operations of the storage unit 117 and the transmitting-receiving unit 119, respectively, and a composition unit 163 composing a complemented image.

In the information system according to this embodiment of such a configuration, the arrangement of the storage unit in the smartphone 1 is omitted, and instead, the server 100 has the storage unit 117. The storage unit 117 stores various data, similarly to the storage unit 17 provided in the smartphone 1 according to the first embodiment.

Also, the arrangement of the composition unit in the control unit 60 provided in the smartphone 1 is omitted, and instead the control unit 160 provided in the server 100 has the composition unit 163. The composition unit 163 superimposes spectroscopic information on an RGB image and thus composes a complemented image of the RGB image complemented with the spectroscopic information, similarly to the composition unit 604 provided in the smartphone 1 according to the first embodiment.

Various data are transferred between the transmitting-receiving unit 19 provided in the smartphone 1 and the transmitting-receiving unit 119 provided in the server 100. Specifically, for example, the transmitting-receiving unit 19 transmits, to the transmitting-receiving unit 119, spectroscopic information, that is, a spectrum, peculiar to the image pickup target object X acquired by the smartphone 1 and an RGB Image of the image pickup target object X, and receives a complemented image of the RGB image complemented with the spectroscopic information from the server 100 via the transmitting-receiving unit 119. The transmitting-receiving unit 119 receives the spectroscopic information, that is, the spectrum, peculiar to the image pickup target object X acquired by the smartphone 1 and the RGB image of the image pickup target object X, from the smartphone 1 via the transmitting-receiving unit 19, and transmits the complemented image of the RGB image complemented with the spectroscopic information to the smartphone 1 via the transmitting-receiving unit 19. The transfer of the various data between the transmitting-receiving unit 19 and the transmitting-receiving unit 119 may be carried out via wired or wireless communication. In the case of wireless communication, it may be via the internet.

The transmission-reception control unit 606 provided in the control unit 60 of the smartphone 1 controls the operation of the transmitting-receiving unit 19 to transmit the spectrum, that is, the spectroscopic information, of the image pickup target object X and the RGB image of the image pickup target object X acquired by the image acquisition unit 603, to the composition unit 163 provided in the server 100 via the transmitting-receiving unit 119. The composition unit 163 superimposes the spectroscopic information on the RGB image and thus composes the complemented image of the RGB image complemented with the spectroscopic information.

The transmission-reception control unit 162 provided in the control unit 160 of the server 100 controls the operation of the transmitting-receiving unit 119 to transfer the complemented image of the image pickup target object X composed by the composition unit 163, from the server 100 to the smartphone 1 via the transmitting-receiving unit 19.

In the information system according to the sixth embodiment of such a configuration, the information system is not completed single-handedly by the smartphone 1, which is an information terminal, and the information system also has the server 100. The database is saved in the storage unit 117 provided in the server 100. The composition unit 163 provided in the server 100 composes the complemented image of the RGB image complemented with the spectroscopic information. Subsequently, the composed complemented image is transmitted to the smartphone 1 via the transmitting-receiving units 19, 119. This is advantageous in that a large calculation load need not be put on the smartphone 1. Also, providing the composition unit 163 with high processing capability enables the composition of the complemented image with higher definition.

Also, when the information system has a plurality of smartphones 1, the database can be shared among the smartphones 1.

Such an information system according to the sixth embodiment achieves effects similar to those of the first embodiment.

In this embodiment, the case where the information system according to the present disclosure has the smartphone 1 as an information terminal and the server 100 is described. However, in the information system according to the present disclosure, the information terminal may be formed of a tablet terminal or the like instead of the smartphone 1. Also, the smartphone 1, that is, the information terminal, may be formed of a digital camera, digital video camera, head-up display (HUD), head-mounted display (HMD), or the like.

In this embodiment, the control unit 60 provided in the smartphone 1 has the light source control unit 601, the spectroscopic control unit 602, the image acquisition unit 603, and the display control unit 605, as in the first embodiment. However, at least one of these may be provided in the control unit 160 in the server 100.

The image processing method, the image processing device, and the information system according to the present disclosure have been described, based on the illustrated embodiments. However, the present disclosure is not limited to these embodiments.

For example, in the information system according to the present disclosure, each configuration can be replaced with any configuration having a similar function. Also, any configuration can be added.

Also, in the information system according to the present disclosure, any two or more configurations described in the first to sixth embodiments may be combined together.

Moreover, any step may be added to the image processing method according to the present disclosure.

What is claimed is:

1. An image processing method comprising:
   receiving light of a measurement wavelength from a target object to pick up a spectroscopic image of the target object;
   repeating the receiving of the light for picking up the spectroscopic image by changing the measurement wavelength each repetition so as to obtain a plurality of the spectroscopic images;
   converting spectral information of the plurality of the spectroscopic images into first XYZ values as tristimulus values;
   deriving first RGB values based on the first XYZ values in consideration of a monitor profile;
   receiving the light from the target object to pick up an RGB image of the target object;
   converting the RGB image into second XYZ values as the tristimulus values;
   deriving second RGB values based on the second XYZ values in consideration of the monitor profile;
   superimposing the first RGB values on the second RGB values so as to generate a complemented image; and
   displaying the complemented image on a display having the monitor profile.

2. The image processing method according to claim 1, wherein a range of the measurement wavelengths includes a range of wavelengths of near-infrared light.

3. The image processing method according to claim 1, wherein
a range of the measurement wavelengths includes a range of wavelengths of yellow visible light.

4. The image processing method according to claim 1, wherein
the complemented image is displayed in an RGB representation.

5. The image processing method according to claim 1, wherein
the complemented image is displayed in a CMY representation.

6. An image processing device comprising:
an RGB camera configured to pick up an RGB image of a target object;
a spectroscopic camera configured to repeatedly pick up a plurality of spectroscopic images of the target object by changing a measurement wavelength each repetition;
a display configured to display the RGB image;
a memory configured to store a program; and
a processor configured to execute the program so as to:
convert spectral information of the plurality of spectroscopic images into first XYZ values as tristimulus values;
derive first RGB values based on the first XYZ values in consideration of a monitor profile;
convert the RGB image into second XYZ values as the tristimulus values:
derive second RGB values based on the second XYZ values in consideration of the monitor profile;
superimpose the first RGB values on the second RGB values so as to generate a complemented image; and
display the complemented image on the display having the monitor profile.

7. An information system comprising:
the image processing device according to claim 6, the image processing device having a first communication device; and
a server having a second communication device, the server being configured to communicate with the image processing device via the first and second communication devices.

* * * * *